United States Patent
Kuroda et al.

(10) Patent No.: US 6,412,347 B1
(45) Date of Patent: Jul. 2, 2002

(54) ANGLE SPEED SENSOR

(75) Inventors: Keisuke Kuroda; Takeshi Uemura, both of Osaka; Toshihiko Ichinose, Nara; Masahiro Saito, Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/554,522

(22) PCT Filed: Sep. 14, 1999

(86) PCT No.: PCT/JP99/05029
§ 371 (c)(1),
(2), (4) Date: Sep. 5, 2000

(87) PCT Pub. No.: WO00/16043
PCT Pub. Date: Mar. 23, 2000

(30) Foreign Application Priority Data

Sep. 16, 1998 (JP) .......................... 10-261144

(51) Int. Cl.⁷ .................................................. G01P 9/04
(52) U.S. Cl. ................................ 73/504.16; 73/504.12
(58) Field of Search ...................... 73/504.12, 504.13, 73/504.14, 504.16, 504.15, 504.04, 504.02, 1.77; 310/329, 370, 316, 317

(56) References Cited

U.S. PATENT DOCUMENTS 5,041,802 A    8/1991    Wei et al. ................. 331/158

6,220,094 B1 *  4/2001   Ichinose et al. ......... 73/504.16

FOREIGN PATENT DOCUMENTS

JP    3-48714    3/1993
JP    9-33262    2/1997

OTHER PUBLICATIONS

"The Art of Electronics", Horowitz et al., pp. 94–95, 1980.*

Y. Yoshino et al., "Yaw Rate Sensor," 1994, vol. 38, pp. 26–33.

* cited by examiner

*Primary Examiner*—Helen Kwok
(74) *Attorney, Agent, or Firm*—Ratner & Prestia

(57) ABSTRACT

An angular rate sensor driving circuit shortens a start-up time without increasing a maximum level of amplification factor of a variable gain amplifier beyond a predetermined degree An output signal of a first amplifier is input to a positive input terminal of a third amplifier, a first resistor is inserted between a negative input terminal of the third amplifier and an output terminal of the third amplifier, a voltage having a potential in the vicinity of ½ of a power supply voltage is impressed on the negative input terminal of the third amplifier through a capacitor, a second resistor and a switch are connected in series between the output terminal of the third amplifier and an input terminal of a second amplifier, and the switch is activated by an output of a level judgement circuit.

1 Claim, 3 Drawing Sheets

Output signal of the means 11 of detecting vibration level

Voltage impressed upon the exciting unit 10

First stage   Second stage

ANGLE SPEED SENSOR

This application is a U.S. National Phase application of PCT International Application PCT/JP99/05029.

FIELD OF THE INVENTION

The present invention relates to an angular rate sensor.

BACKGROUND OF THE INVENTION

As a known angular rate sensor of the prior art, there is disclosed one in page 26 through page 33 of the Journal of Nippondenso Engineering Society (Vol. 38, No. 3, 1994). This angular rate sensor comprises an exciting unit for providing a tuning fork vibrator with vibration, a means for detecting a vibration level of the vibrator, a detection means for detecting Coriolis' force generated responsive to an angular rate, a first amplifier for amplifying an output signal of the means for detecting vibration level, a rectifier circuit for rectifying an output signal of the first amplifier to obtain a DC voltage, a comparator of an output voltage of the rectifier circuit with a reference voltage, and a variable gain amplifier connected to the exciting unit in a manner that a vibrating amplitude of the tuning fork vibrator is controlled to be constant by varying an amplification factor for amplifying a voltage, which is produced by shifting a phase of an output voltage of the first amplifier by 90 degrees, according to an output voltage of the comparator.

With the prior art technique as described above, there is an effect to a certain extent for shortening a start-up time of the sensor, because the variable gain amplifier operates in a manner to rapidly increase a vibrating amplitude of the tuning fork vibrator, since the amplification factor of the variable gain amplifier becomes the maximum within a predetermined degree immediately after a power supply is turned on. However, because a variable range of the amplification factor of the variable gain amplifier is limited and it can not be boosted so much, it has needed a fairly long time for the tuning fork vibrator before a level of its vibrating amplitude reaches a predetermined degree. In addition, although it is possible to shorten the start-up time of the sensor if the maximum level of amplification factor of the variable gain amplifier is set greater than the predetermined degree, it is difficult to increase the maximum level of amplification factor of the variable gain amplifier beyond the predetermined degree from an overall aspect including a problem of saturation in waveform of an output voltage of the variable gain amplifier, maintaining noise low, and stability in controlling a vibrating amplitude of the tuning fork vibrator constant.

It is therefore difficult to shorten a time (the start-up time) required to bring the vibrating amplitude of the tuning fork vibrator constant without boosting the maximum level of amplification factor of the variable gain amplifier beyond the predetermined degree. Moreover, it is extremely difficult to reduce a time constant $\tau = Q/2\pi f$ (where "f" is a driving frequency) without a substantial increase of "f", in a such case as a crystal tuning fork vibrator having a large degree of sharpness "Q" (vibrating energy/supplied energy). Therefore, it becomes a considerable obstacle to be not able to boost the maximum level of amplification factor of the variable gain amplifier beyond the predetermined degree in order to reduce the start-up time.

SUMMARY OF THE INVENTION

An angular rate sensor includes an exciting unit for providing a vibrator with vibration, a means for detecting a vibration level of the vibrator, a detection means for detecting Coriolis' force generated responsive to an angular rate, a first amplifier for amplifying an output signal of the means of detecting vibration level, a rectifier circuit for rectifying an output signal of the first amplifier to obtain a DC voltage, a variable gain amplifier for taking as an input the output signal of the first amplifier and for varying an amplification factor according to an output voltage of the rectifier circuit, a second amplifier for amplifying an output signal of the variable gain amplifier, a level judgement circuit in which the output voltage of the rectifier circuit and an output voltage of a reference voltage generator are input, and a third amplifier and a switching means placed between the first amplifier and the second amplifier. The output signal of the first amplifier is input to a positive input terminal of the third amplifier. A first resistor is inserted between a negative input terminal of the third amplifier and an output terminal of the third amplifier. A voltage having a potential in the vicinity of ½ of a power supply voltage is impressed on the negative input terminal of the third amplifier. A second resistor and the switching means are connected in series between the output terminal of the third amplifier and an input terminal of the second amplifier. The switching means is activated by an output of the level judgement circuit.

A structure as described above is able to realize a reduction of the start-up time of the angular rate sensor, while clearing entirely the general matters such as a problem of saturation in waveform of an output voltage of the variable gain amplifier, maintaining noise low, and stability in controlling a vibrating amplitude of the tuning fork vibrator constant. It is especially effective in such case as a crystal tuning fork vibrator having a large degree of sharpness "Q".

DESCRIPTION OF THE PREFERRED EMBODIMENTS

Exemplary Embodiment

Figure 1:
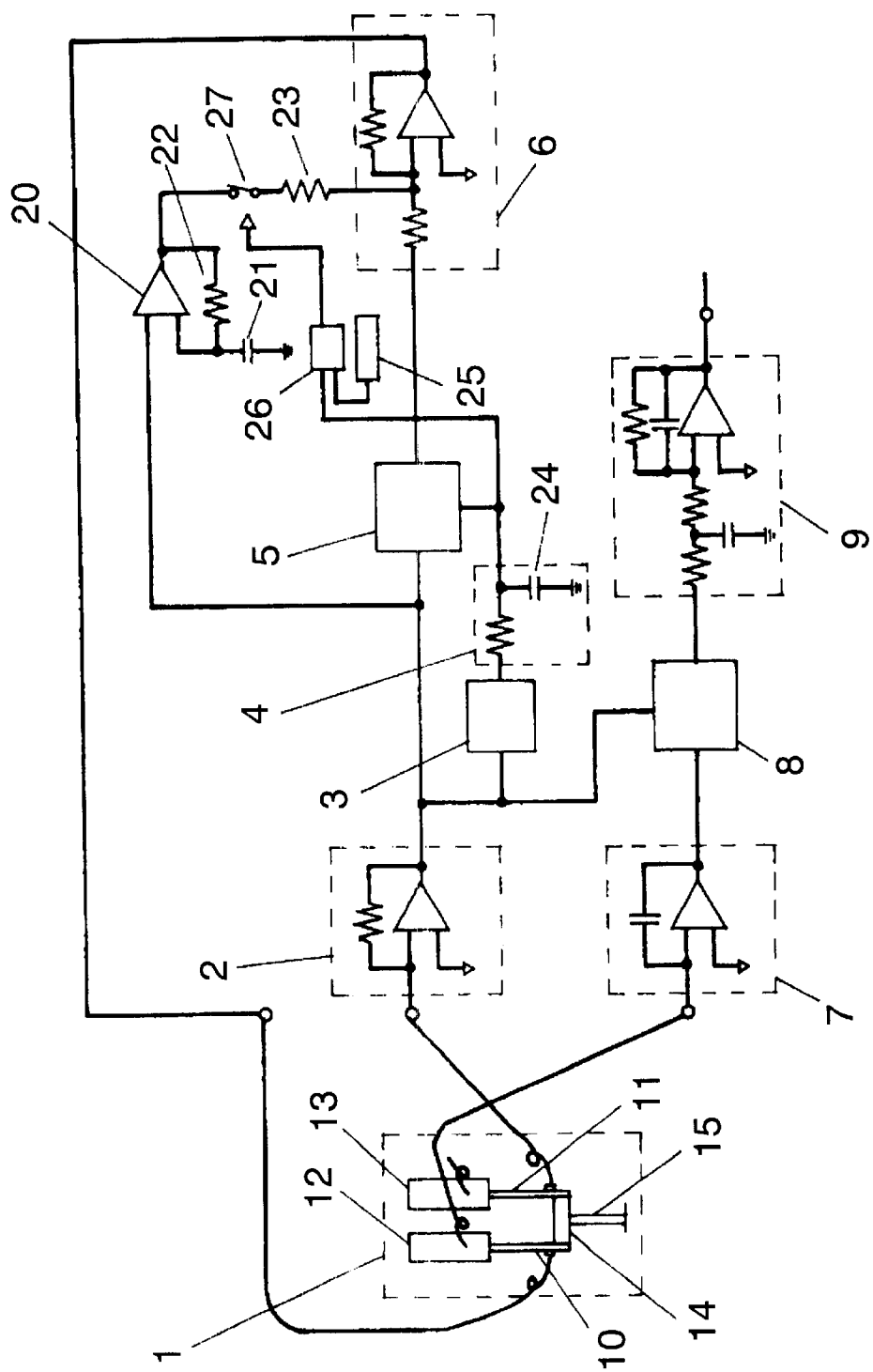
FIG. 1 is a block diagram depicting an exemplary embodiment of an angular rate sensor of the present invention.

FIG. 1 is a block diagram of an angular rate sensor of an exemplary embodiment of the present invention. Referring to FIG. 1, designated at a numeral 1 is a vibration type angular rate sensor element block having a tuning fork structure, a numeral 2 is a first amplifier, a numeral 3 is a rectifier, a numeral 4 is a smoothing circuit, a numeral 5 is a variable gain amplifier, a numeral 6 is a second amplifier, a numeral 7 is a fourth amplifier, a numeral 8 is a synchronous detector, and a numeral 9 is a low-pass filter. A reference numeral 10 designates an exciting unit composed of a piezo-electric element attached to a vibrating member, a numeral 11 is a means composed of another piezo-electric element attached to a vibrating member for detecting a vibration level, and numerals 12 and 13 are first and second detection means for detecting Coriolis' force generated responsive to an angular rate. The exciting unit 10 and the first detection means 12 are bonded together orthogonally to each other, the means 11 of detecting vibration level and the second detection means 13 are also bonded orthogonally to each other, and these are connected by a connecting plate 14.

The vibration type angular rate sensor element block 1 having a tuning fork structure is thus constructed by supporting the connecting plate 14 at one point with a supporting post 15. There comprises the means 11 for detecting a vibration level of tuning-fork vibration caused by oscillation of the exciting unit 10, the first amplifier 2 for amplifying an output signal of the means 11 of detecting vibration level as its input signal, the rectifier 3 for rectifying an output signal of the first amplifier 2, the smoothing circuit 4 for smoothing an output voltage of the rectifier 3, the variable gain amplifier 5 whose amplification factor for amplifying an output voltage of the first amplifier 2 varies responsive to a magnitude of an output voltage of the smoothing circuit 4, thereby controlling a vibrating amplitude of the tuning fork vibrator constant, and the second amplifier 6 for amplifying an output signal of the variable gain amplifier.

Signals of the first and the second detection means 12 and 13 for detecting Coriolis' force generated responsive to an impressed angular rate are amplified by the fourth amplifier 7, detected by the synchronous detector 8 at a vibrating cycle of the tuning fork vibrator to become a voltage proportional to the angular rate, and it is output as an angular rate voltage signal after amplified by the low pass filter 9.

Furthermore, in FIG. 1, a reference numeral 20 designates a third amplifier, numeral 21 a capacitor, numeral 22 a first resistor, numeral 23 a second resistor, numeral 24 a capacitor, numeral 25 a reference voltage generator, numeral 26 a level judgment circuit, and numeral 27 a switching means.

In addition, there are provided with the level judgment circuit 26, in which the output voltage of the smoothing circuit 4 and an output voltage of the reference voltage generator 25 are input, and the third amplifier 20 and the switching means 27 between the first amplifier 2 and the second amplifier 6. A negative input terminal of the third amplifier 20 is connected with a voltage having ½ of a power supply voltage Vcc through the capacitor 21.

Moreover, an output signal of the first amplifier 2 is input to a positive input terminal of the third amplifier 20, the first resistor 22 is inserted between the negative input terminal of the third amplifier 20 and an output terminal of the third amplifier 20, and the second resistor 23 and the switching means 27 are connected in series between the output terminal of the third amplifier 20 and an input terminal of the second amplifier 6. The first resistor 22 and the second resistor 23 are 1 MΩ and 20 kΩ respectively, and the switching means 27 is turned on and off according to a potential of voltage charged in the capacitor 24, the level judgment circuit 26 (a voltage potential set by the reference voltage generator 25 is denoted as V1), and the timing chart for switching control shown in FIG. 2, after a power supply (not shown) is turned on. The third amplifier 20 operates for an output waveform between the power supply voltage and the grounding voltage with the reference voltage (½ of the power supply voltage Vcc) at the median, and that the third amplifier 20 goes on and off respectively in a first stage and a second stage shown in the timing chart (refer to FIG. 2). As shown in FIG. 3, an output voltage in the second amplifier 6 can be made very large (a voltage impressed upon the exciting unit 10 becomes maximum of the output voltage from the start) during an initial stage when a vibrating amplitude of the tuning fork vibrator is small (i.e. the initial stage wherein an output signal of the means 11 of detecting vibration level is small), and an amplification factor of it becomes small (the voltage impressed upon the exciting unit 10 becomes small) in the latter half when the vibrating amplitude of the tuning fork vibrator becomes closer to a predetermined level (i.e. in a stage wherein the output signal of the means 11 of detecting vibration level reaches a predetermined value). It is therefore possible to clear entirely the general matters such as a problem of saturation in waveform of the output voltage, maintaining noise low, and stability in controlling the vibrating amplitude of the tuning fork vibrator constant, because not only is it capable of substantially reducing a start-up time of the angular rate sensor, but also is it capable of activating the third amplifier 20 by the switching means 7 only when necessary during the start-up, thereby maintaining the maximum level of amplification factor of the variable gain amplifier 5 at a predetermined level as in the past at least after having entered into a final control stage.

Figure 2:
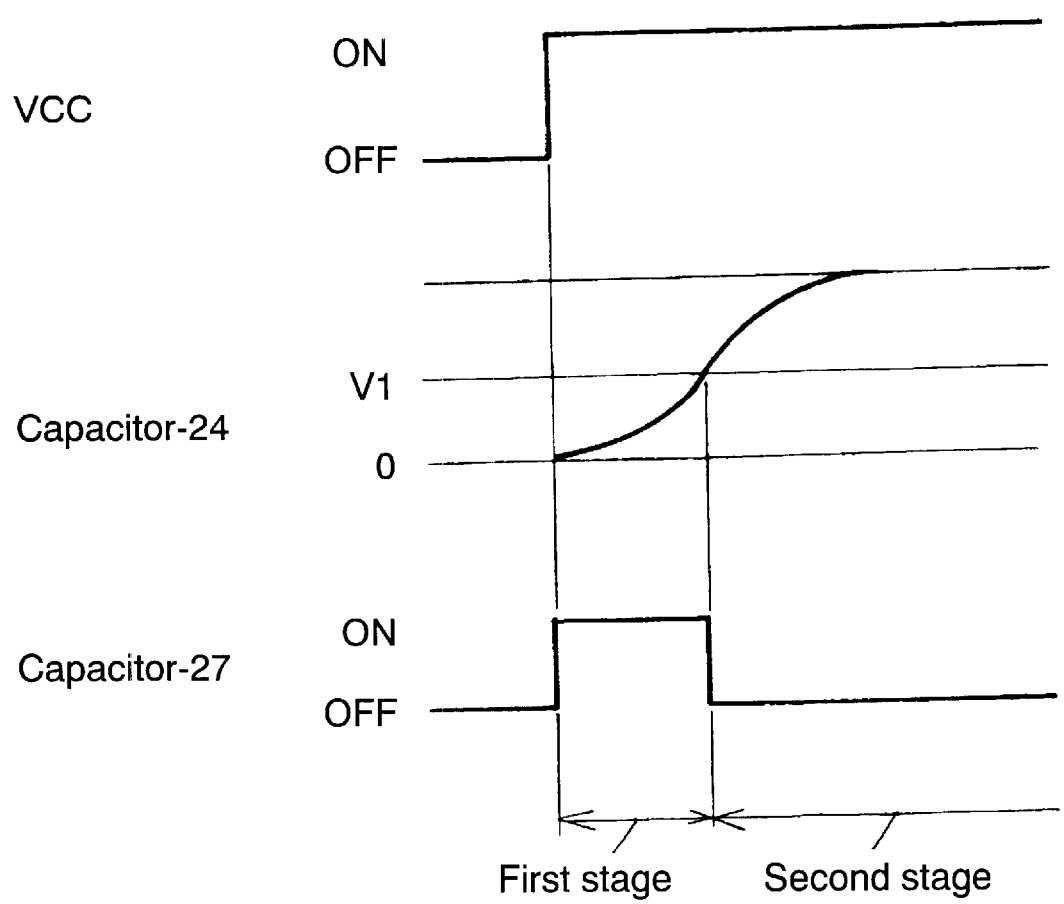
FIG. 2 is a timing chart for switching control of a second voltage amplifier in the same sensor and FIG. 3 is a graphical representation depicting an output signal of a means of detecting vibration level and a mode of voltage applied to a vibration exciting unit.
Figure 3:
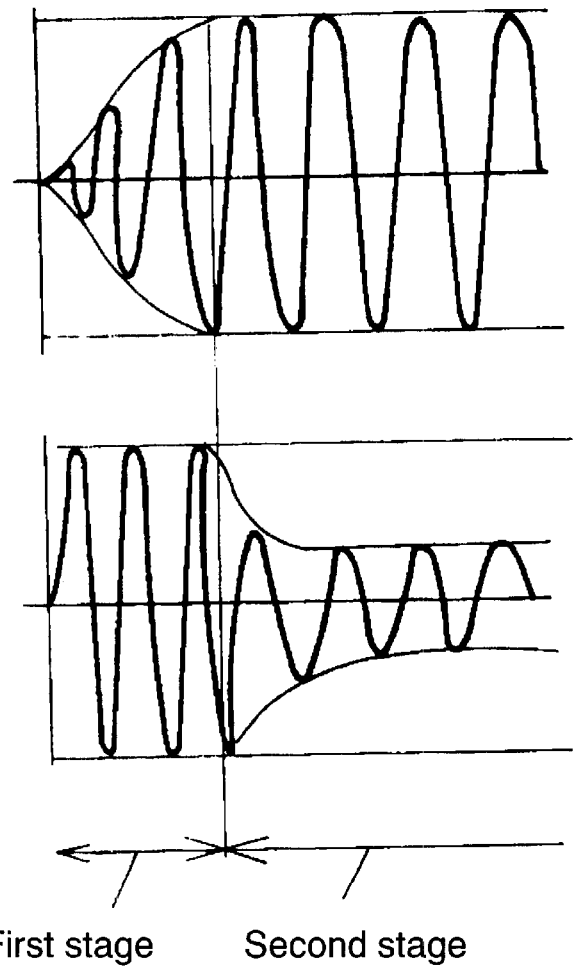

Moreover, it is also possible to arbitrarily set a time for the vibrating amplitude of the tuning fork vibrator to become constant, as a matter of course, by setting the voltage potential charged in the capacitor 24 and the voltage potential V1 set in the level judgment circuit 26, as desired, and also by setting the amplification factor in each stage, as shown in FIG. 2.

Although what has been described in the present exemplary embodiment relates only to an example of the vibration type angular rate sensor element block having a tuning fork structure, composed of a piezo-electric element attached to a vibration member, this is not necessarily restrictive. If a crystal tuning fork vibrator having a large degree of sharpness "Q" is used, in particular, as the vibration type angular rate sensor element block of a tuning fork structure, its effectiveness becomes remarkable.

Furthermore, the vibrator needs not be limited only to the vibration type having the conventional tuning fork structure.

Moreover, although what has been described in the present exemplary embodiment is an example in which the voltage having ½ of the power supply voltage Vcc is connected to the negative input terminal of the third amplifier 20 through the capacitor 21, it needs not be precisely ½, but any value in the vicinity of the ½ can suffice the requirement properly.

INDUSTRIAL APPLICABILITY

According to the present invention, as described above, an angular rate sensor is provided which not only has a function of arbitrarily setting a time for vibrating amplitude of a vibrator to become constant, but also is capable of substantially reducing a start-up time while clearing entirely the general matters such as a problem of saturation in waveform of an output voltage of a variable gain amplifier, maintaining noise low, and stability in controlling the vibrating amplitude of the vibrator constant, since it can maximize an output voltage of a second amplifier by a third amplifier and a switching means upon a start-up, and maintain the maximum level of amplification factor of the variable gain amplifier at a predetermined level as in the past at least after having entered into a final control stage.

What is claimed is:

1. An angular rate sensor comprising:

an exciting unit for providing a vibrator with vibration;

a means for detecting a vibration level of said vibrator;

a detection means for detecting Coriolis' force generated responsive to an angular rate;

a first amplifier for amplifying an output signal of said means of detecting vibration level;

a rectifier circuit for rectifying an output signal of said first amplifier to obtain a DC voltage;

a variable gain amplifier for taking as an input the output signal of said first amplifier, wherein an amplification factor varies according to an output voltage of said rectifier circuit;

a second amplifier for amplifying an output signal of said variable gain amplifier;

a level judgement circuit for generating an output corresponding to a level of the output voltage of said rectifier circuit; and a third amplifier and a switch placed between said first amplifier and said second amplifier, wherein the output signal of said first amplifier is input to a positive input terminal of said third amplifier;

a first resistor is inserted between a negative input terminal of said third amplifier and an output terminal of said third amplifier;

a voltage having a potential in the vicinity of ½ of a power supply voltage is impressed upon the negative input terminal of said third amplifier through a capacitor;

a second resistor and said switch means are connected in series between the output terminal of said third amplifier and an input terminal of said second amplifier; and said switch means is activated by said output of said level judgement circuit.

\* \* \* \* \*